United States Patent [19]

Nakada et al.

[11] 3,707,954
[45] Jan. 2, 1973

[54] EXHAUST GAS PURIFYING DEVICE

[75] Inventors: Masahiko Nakada; Hirofumi Matsumoto, both of Toyota, Japan

[73] Assignee: Toyota Jidosha Kogyo Kabushiki Kaisha, Aichi-ken, Japan

[22] Filed: June 17, 1971

[21] Appl. No.: 153,993

[30] Foreign Application Priority Data

Feb. 24, 1971  Japan .................................. 46/9189

[52] U.S. Cl. ............ 123/117 A, 123/97 B, 123/119 D, 123/124 R, 123/124 B
[51] Int. Cl. ........................... F02p 5/10, F02m 7/00
[58] Field of Search ...................... 123/117 A, 119 D, 119 B, 124 R, 123/124 B, 97 B

[56] References Cited

UNITED STATES PATENTS

| | | | |
|---|---|---|---|
| 3,447,518 | 6/1969 | Walker | 123/117 A |
| 3,603,298 | 9/1971 | Toda et al. | 123/117 A |
| 3,612,018 | 10/1971 | Sobrerski | 123/117 A |

*Primary Examiner*—Wendell E. Burns
*Attorney*—David Toren et al.

[57] ABSTRACT

An exhaust gas purifying device for internal combustion engines comprising a thermo-valve mounted in an air passage through which secondary air is supplied to the intake manifold and adapted to operate by responding to the degree to which the engine is warmed up, a flow rate regulating valve also mounted in said air passage through which secondary air is supplied to the intake manifold and adapted to regulate the flow rate of secondary air supplied to the intake manifold in accordance with the operating condition of the engine, a first orifice and a second orifice provided in a branch passage branching from an air passage between said two valves, a first connecting line mounted between the portion of the branch passage which is disposed posterior to the first orifice and a diaphragm chamber of a vacuum advancer provided in the ignition distributor for maintaining communication therebetween, and a second connecting line mounted between the portion of the branch passage which is disposed posterior to the second orifice and a vacuum port of the carburetor for maintaining communication therebetween. The secondary air flow rate can be regulated and the degree of vacuum advance can be reduced in accordance with the operating condition of the engine.

3 Claims, 7 Drawing Figures

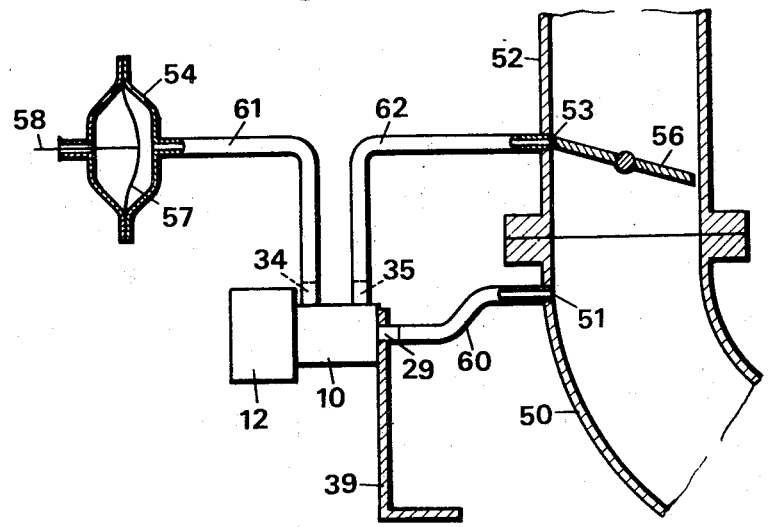
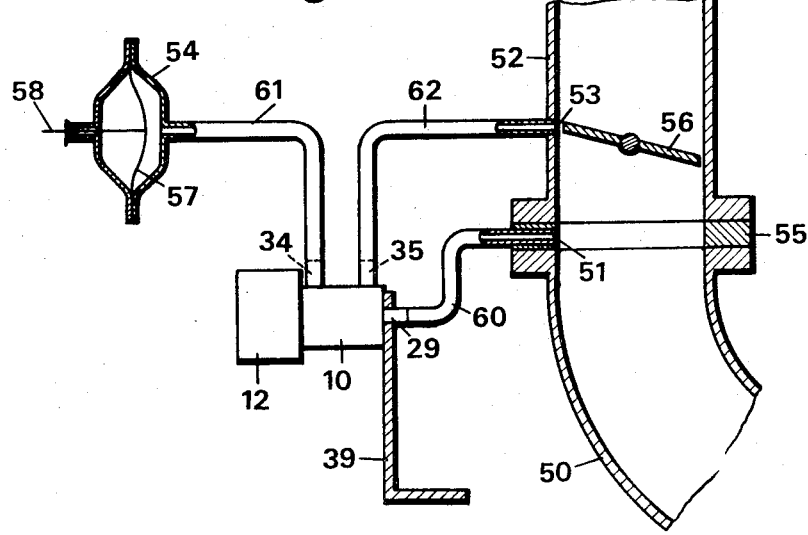

EXHAUST GAS PURIFYING DEVICE

This invention relates to an exhaust gas purifying device for motor vehicles provided with a gasoline engine of the carburetor type which device is effective to reduce noxious gas components, such as carbon monoxide, unburned hydrocarbons, oxides of nitrogen and the like, of the exhaust gas and at the same time to reduce fuel consumption.

Generally, the levels of carbon monoxide, unburned hydrocarbons and oxides of nitrogen in the exhaust gas and the fuel consumption level show changes proportional to changes in the air-fuel mixture ratio supplied to the engine as shown in FIG. 6.

More specifically, it is required to increase the richness of the mixture supplied to the engine before it is warmed up as compared with the mixture supplied to the engine after it is warmed up. Thus, the air-fuel mixture ratio is generally set at a range from 12 to 14 before the engine is warmed up. It is believed that, when the engine is idling or operated under partial load after being thoroughly warmed up, it is possible to reduce the richness of the mixture to a range from 13 to 16 without adversely affecting the driveability of the vehicle. As a result, the levels of carbon monoxide and hydrocarbons in the exhaust gas are reduced and the fuel consumption level is reduced too, but the level of oxides of nitrogen in the exhaust gas is increased as can be seen from FIG. 6.

The levels of hydrocarbons and oxides of nitrogen can be reduced by delaying the ignition time as can be seen from FIG. 7. The fuel consumption level does not show an appreciable increase even if the ignition time is delayed to a certain extent when partial load is applied to the engine. The level of carbon monoxide shows no changes even if the ignition time is varied.

Proposals have been made to purify exhaust gas of motor vehicles by using a device for supplying secondary air to the intake manifold or a device for regulating secondary air depending on a change in temperature or operating conditions. These devices have a disadvantage in that, although the richness of the air-fuel mixture supplied to the engine can be reduced and the levels of carbon monoxide and hydrocarbons in the exhaust gas may be reduced, the level of oxides of nitrogen in the exhaust gas increases.

There has hitherto been proposed a method of reducing the levels of hydrocarbons and oxides of nitrogen in the exhaust gas by totally eliminating the vacuum advancer of the ignition distributor and greatly delaying the ignition time when partial load is applied to the engine. This method is not without disadvantages. When it is used, reduction in the output power of the engine has deleterious effect on the driveability of the vehicle and markedly increases fuel consumption.

This invention obviates the aforementioned disadvantages of conventional exhaust gas purifying devices and method.

An object of this invention is to provide an exhaust gas purifying device constructed as described in claims which is effective to simultaneously reduce the levels of carbon monoxide, hydrocarbons and oxides of nitrogen in the exhaust gas and to reduce fuel consumption without decreasing the maximum output power of the engine and the driveability of the vehicle.

Another object of the invention is to provide an exhaust gas purifying device which can be easily installed in motor vehicles now being available in the market.

According to this invention, there is provided an exhaust gas purifying device which is capable of reducing the richness of air-fuel mixture ratio supplied to the engine by supplying an optimum amount of secondary air to the intake manifold which is commensurate with the operating condition when the engine is idling or operating under partial load after being warmed up and which is capable of reducing the vacuum advance a suitable amount when the engine is operating under partial load after being warmed up.

Additional objects as well as features and advantages of the invention will become evident from the description set forth hereinafter when considered in conjunction with the accompanying drawings, in which:

FIG. 3 is a view in explanation of the mounting of the device of FIGS. 1 and 2 in a gasoline engine of the carburetor type;

FIG. 4 is a view in explanation of a modification of the manner of mounting of the device shown in FIG. 3;

Figure 6:
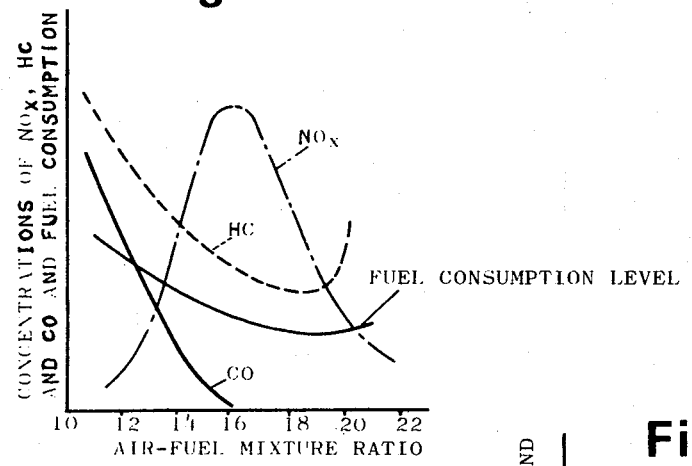
Figure 7:
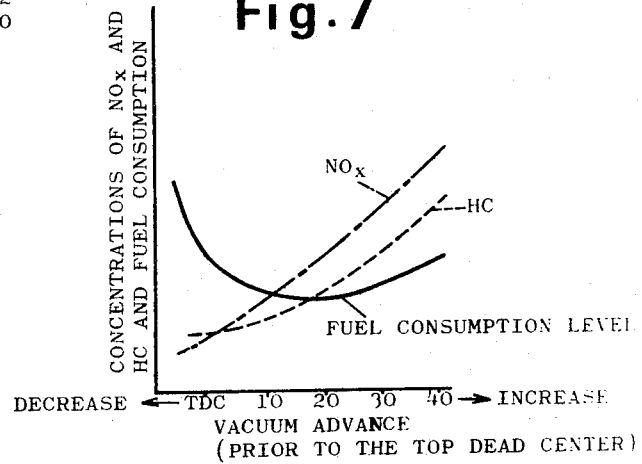

FIG. 6 is a diagrammatic representation of the relation between the air-fuel mixture ratio on the one hand and the levels of carbon monoxide, unburned hydrocarbons and oxides of nitrogen in the exhaust gas and fuel consumption on the other; and FIG. 7 is a diagrammatic representation of the relation between the ignition timing on the one hand and the levels of unburned hydrocarbons and oxides of nitrogen in the exhaust gas and fuel consumption on the other.

The construction of the device according to this invention will be explained in detail with reference to the drawings which show preferred embodiments of this invention.

Figure 1:
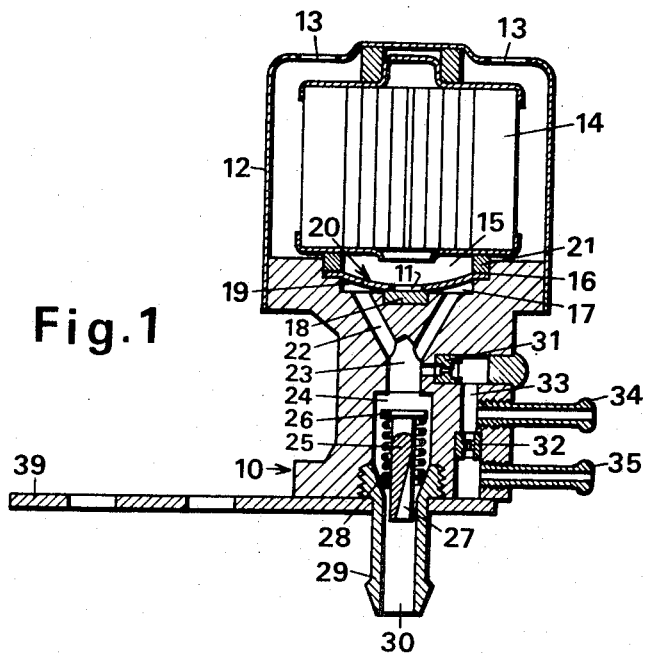
FIG. 1 is a vertical sectional side view of one embodiment of this invention.

In FIG. 1, a cylindrical air cleaner cover 12 formed in its upper wall with a plurality of air introducing openings 13 is fitted at its open bottom over a main body 10 of the exhaust gas purifying device. An air cleaner element 14 is disposed in the air cleaner cover 12.

The main body 10 is formed in its upper portion with a recess 15. An annular offset portion 16 of a diameter greater than the diameter of the recess 15 is provided concentrically with the recess 15 to be disposed at the edge of the recess. The annular offset portion 16 has a suitable depth from the upper surface of the main body 10. A cylindrical valve seat 18 projecting slightly outwardly of a bottom 17 of the recess 15 is formed integrally with the main body 10.

Provided in the recess 15 is a bimetallic strip 19 shaped like a pan which is substantially of the same diameter as the annular offset portion 16 and formed in its central portion with an air suction opening 11 smaller in diameter than the valve seat 18. The bimetallic strip 19 is mounted such that, when its outer marginal portion is placed on the annular offset portion 16, the air suction opening 11 is brought into intimate engagement with the valve seat 18. A ring 21 is fitted in the annular offset portion 16 so as to fix the outer marginal portion of the bimetallic strip 19 on the annular offset portion 16 in the manner described.

The valve seat 18, bimetallic strip 19 and air suction opening 11 constitute a thermo-valve 20 which is adapted to operate quickly as the engine is warmed up.

Air passages 22, 22 are connected to the bottom surface 17 of the recess 15 to maintain communication between the recess 15 and a chamber 23 formed in the axial portion of the main body 10. Formed below the chamber 23 in the main body 10 is another chamber 24 which is of larger diameter than the chamber 23. Connected to the lower end of the lower chamber 24 is a connecting line 29 which is connected to flexible hose 60 extending to an opening 51 of a suction manifold 50 as shown in FIG. 3. The connecting line 29 has a bore 30 which is of the same diameter as an air flow rate regulating valve 25 of the column shape mounted in the chamber 24. A flange 26 is formed integrally at the head of the air flow rate control valve 25 which is formed at one side thereof with a vertically disposed divergingly tapering cutout 27 of a suitable dimension which becomes greater in depth in going from top to bottom. The lower portion of the air flow rate regulating valve 25 is inserted in the bore 30 of the connecting line 29, and a coil spring 28 is mounted between the flange 26 and connecting line 29 so as to normally urge the valve 25 to move toward the chamber 23 by the biasing force of the spring 28.

A branch passage 33 is formed on one side of the chamber 23, and a first orifice 31 and a second orifice 32 are provided in the branch passage 33. A connecting line 34 is connected to a portion of the branch passage 33 which is disposed posterior to the first orifice 31, and another connecting line 35 is connected to a portion of the branch passage 33 which is disposed posterior to the second orifice 32.

The numeral 39 designates a fixing plate used for securedly mounting the main body 10 as to the engine in a fixed state.

Figure 2:
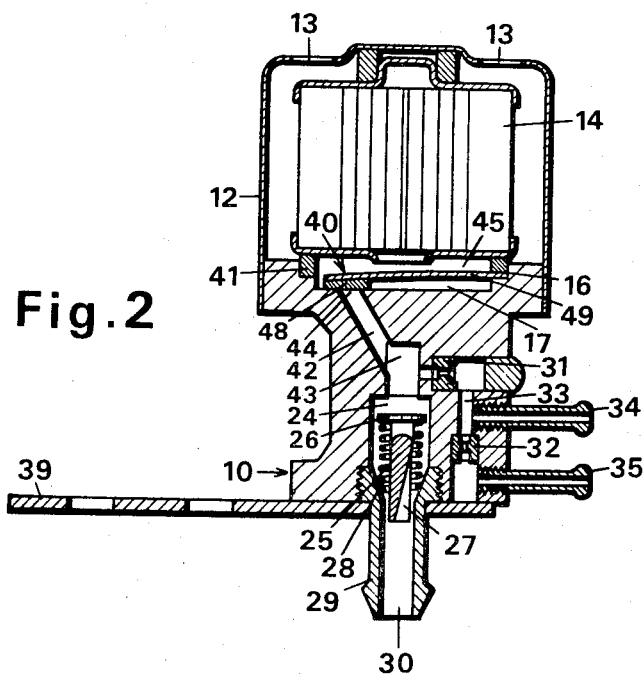
FIG. 2 is a vertical sectional side view of another embodiment of this invention.

FIG. 2 shows another embodiment of the invention which comprises a thermo-valve of the type which is adapted to operate slowly and gradually as the engine is warmed up. As shown, a recess 45 and an offset portion 16 are formed in the upper surface of the main body 10. An air passage 42 in the form of an angling duct 42 is formed in the main body 10 to open at one end in the outer marginal portion of the bottom surface 17 of the recess 45 and at the other end in a chamber 43 formed in the axial portion of the main body 10. A valve seat 48 of greater diameter than an opening 44 of the air passage 42 in the bottom surface 17 is mounted on the opening 44. The valve seat 48 is provided on the underside of a bimetallic strip 49 which is attached at one end portion thereof to the valve seat 48 and supported at the other end portion thereof by a ring 41 fitted in the annular offset portion 16 to support the bimetallic strip 49 in a cantilever fashion, so that the bimetallic strip 49 can cause the valve seat 48 to close the opening 44 of the air passage 42.

The bimetallic strip 49, valve seat 48, and opening 44 of the air passage 42 constitute a temperature responsive valve 40.

Other elements of the embodiment shown in FIG. 2 are similar to those of the embodiment illustrated in FIG. 1.

FIGS. 3 and 4 show different manners of mounting the main body 10 of the exhaust gas purifying device according to this invention in a gasoline engine of the carburetor type. The main body 10 shown in FIG. 3 is mounted such that the connecting line 29 thereof is connected to an air supply port 51 formed on a side wall of an intake manifold 50 on the engine side by the flexible hose 60, such as a rubber tube. The connecting line 35 disposed downwardly of the second orifice 32 is connected, by a flexible hose 62, to a vacuum port 53 for vacuum advance formed in a side wall of a carburetor 52 in the vicinity of an end of a throttle valve 56 of the carburetor 52, and the connecting line 34 disposed posterior to the first orifice 31 and upwardly of the second orifice 32 is connected, by a hose 61, to a vacuum advance diaphragm chamber 54 of the ignition distributor. Connected to the center of a diaphragm 57 of the diaphragm chamber 54 is an advancer rod 58. The FIG. 4 shows a manner of mounting the main body 10 when no air supply port 51 is formed on a side wall of the suction manifold 50. As shown, a spacer 55 formed with an air supply port 51 is inserted between the suction manifold 50 and carburetor 52, and the air supply port 51 of the spacer 55 is connected to the connecting line 29 of the main body 10 by the flexible hose 60, such as a rubber tube.

FIGS. 1 and 2 show the engine in a cold state. Before the engine is warmed up, the air suction opening 11 formed in the bimetallic strip 19 is maintained in intimate contact with the valve seat 18 so that the opening 11 is closed. As the engine is thoroughly warmed up and the heat of the engine main body is transmitted to the bimetallic strip 19 through the fixing plate 39 and main body 10, the bimetallic strip 19 quickly buckles into an upwardly directed convex shape. As a result, the air suction opening 11 in the bimetallic strip 19 is released from engagement with the valve seat 18 and, at the same time, air is drawn by vacuum through the air introducing openings 13 formed at the top of the air cleaner cover 12 into the air cleaner element 14, thence to the chamber 23 through the air suction opening 11 formed in the bimetallic strip 19 and air passages 22, 22. At this time, a vacuum corresponding to the vacuum in the suction line of the engine is applied to the bore 30 of the connecting line 29 because the latter is connected to the air supply port 51 of the intake manifold 50 of the engine, so that the air flow rate regulating valve 25 in the chamber 24 moves to a position in which the vacuum in the bore 30 of the connecting line 29 and the biasing force of the spring 28 balance. While the valve 25 is maintained in this position, secondary air is supplied in an amount corresponding to the operating condition of the engine to the air supply port 51 of the intake manifold 50 through the cutout 27 formed in the valve 25.

On the other hand, the air in the portion of the branch passage which is disposed downwardly of the second orifice 32 is maintained in negative pressure which is substantially the same as the negative pressure in the suction line. However, since air is discharged through the first and second orifices 31 and 32, the air in the portion of the branch passage 33 which is disposed upwardly of the second orifice 32 is at a pressure level which is intermediate between the negative pressure in the suction line and the atmospheric pressure. The air at this intermediate pressure level is introduced through the connecting line 34 into the vacuum advance diaphragm chamber 54 of the ignition distributor.

In the case of the embodiment shown in FIG. 2, as the engine is warmed up, the heat of the engine main body and the like is gradually transmitted through the fixing plate 39 and main body 10 to the bimetallic strip 49 which is mounted such that the valve seat 48 provided on the underside of one end portion of the bimetallic strip 49 closes the opening 44 of the air passage 42. As the bimetallic strip 49 is thus heated, the free end portion of the bimetallic strip 49 gradually buckles upwardly, so that the valve seat 48 is released from engagement with the opening 44 to open the latter. As a result, air is drawn by suction through the air introducing openings 13 formed in the upper wall of the air cleaner cover into the air cleaner element 14. The air introduced into the air cleaner element 14 flows into the air passage 42 and chamber 43 in an amount which is commensurate with the degree to which the engine is warmed up. The operation of the elements concerned after the inflow of air into the air passage 42 and chamber 43 is the same as explained with reference to the embodiment shown in FIG. 1.

The first and second embodiments of this invention are constructed and operate as aforementioned. It will be appreciated that the air flow rate regulating valve 25 according to this invention is capable of supplying secondary air to the air supply port 51 of the intake manifold 50 in an amount which is commensurate with the operating condition of the engine by virtue of the provision of the divergingly tapering cutout 27 and spring 28 therein, so that the richness of the air-fuel mixture can be reduced and consequently the levels of carbon monoxide and hydrocarbons in the exhaust gas as well as fuel consumption can be reduced.

The first orifice 31 and second orifice 32 perform the function of reducing the vacuum applied to the vacuum advancer diaphragm chamber 54 of the ignition distributor to a level which is below the level of the vacuum supplied through the vacuum port 53 of the carburetor 52. This actuates the advancer rod 58 and the degrees of vacuum advance is reduced to a level which is below the level of the degrees of vacuum advance prevailing before the device according to this invention is mounted. Thus, in FIG. 5 the ignition time can be delayed from a level *a* attained before the device according to this invention is mounted to a level *b* which is attained after the device according to this invention is mounted. By suitably selecting the delay in ignition time, it is possible to reduce the levels of hydrocarbons and oxides of nitrogen in the exhaust gas without appreciably increasing fuel consumption.

It will also be appreciated that the thermo-valve 20 comprising the bimetallic strip 19, air suction port 11 and valve seat 18 as shown in FIG. 1 and the thermo-valve 40 comprising the bimetallic strip 49, valve seat 48 and opening 44 of the air passage 42 as shown in FIG. 2 operate such that the port 11 and opening 44 are opened so that the aforementioned functions of supplying secondary air and delaying the ignition time are performed only after the engine is thoroughly warmed up. This is conducive to the prevention of deterioration of the operating condition of the motor vehicle.

The thermo-valve 20 is adapted to be quickly brought to an open position from a closed position when the engine is warmed up to a predetermined degree. Thus, the valve 20 is reliable in performance. On the other hand, the thermo-valve 40 is capable of automatically adjusting the degree of its opening depending on the degree to which the engine is warmed up. Thus, the valve 40 permits to supply secondary air in an amount which is commensurate with the degree to which the engine is warmed up and to delay the ignition time in accordance with the degree to which the engine is warmed up.

Figure 5:
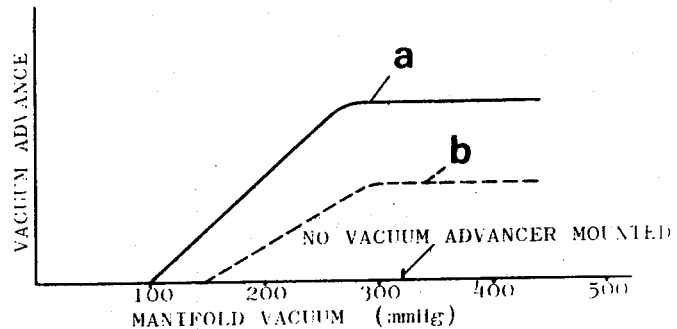
FIG. 5 is a diagrammatic representation of the relation between the manifold vacuum and degrees of vacuum advance.

If the device according to this invention is used, the amount of secondary air supplied to the intake manifold will be very small as compared with the total amount of suction air and vacuum advance will not be effected as shown in FIG. 5 when the vacuum in the manifold is at a level below 100 mmHg and the engine requires a large power output, so that no power output will be wasted. The device according to this invention can achieve the aforementioned results when mounted on motor vehicles now being available in the market.

What is claimed is:

1. An exhaust gas purifying device for internal combustion engines comprising a thermo-valve mounted in an air passage through which secondary air is supplied to the intake manifold and adapted to operate by responding to the degree to which the engine is warmed up, a flow rate regulating valve also mounted in said air passage through which secondary air is supplied to the intake manifold and adapted to regulate the flow rate of secondary air supplied to the intake manifold in accordance with the operating condition of the engine, a first orifice and a second orifice provided in a branch passage branching from an air passage between said two valves, a first connecting line mounted between the portion of the branch passage which is disposed posterior to the first orifice and a diaphragm chamber of a vacuum advancer provided in the ignition distributor for maintaining communication therebetween, and a second connecting line mounted between the portion of the branch passage which is disposed posterior to the second orifice and a vacuum port of the carburetor for maintaining communication therebetween, whereby the secondary air flow rate can be regulated and the degree of vacuum advance can be reduced in accordance with the operating condition of the engine.

2. An exhaust gas purifying device as defined in claim 1 wherein said thermo-valve comprises a bimetallic strip of the pan shape formed with an air suction port in the central portion which is adapted to suddenly buckle into an upwardly directed convex shape when the engine is thoroughly warmed up so as to thereby introduce secondary air to the intake manifold.

3. An exhaust gas purifying device as defined in claim 1 wherein said thermo-valve comprises a bimetallic strip supported in a cantilever fashion which is adapted to operate gradually as the engine is warmed up till it is brought to a fully open position when the engine is thoroughly warmed up.

* * * * *